United States Patent [19]

Wood et al.

[11] Patent Number: 4,703,173

[45] Date of Patent: Oct. 27, 1987

[54] PROBE FOR COLLECTING LIGHT FOR A RADIATION MONITORING DEVICE

[75] Inventors: Charles H. Wood, Rockville; Richard W. Stowe, Gaithersburg, both of Md.

[73] Assignee: Fusion Systems Corporation, Rockville, Md.

[21] Appl. No.: 836,896

[22] Filed: Mar. 6, 1986

[51] Int. Cl.[4] .............................................. H01J 5/16
[52] U.S. Cl. ..................................... 250/227; 356/236
[58] Field of Search ............... 356/225, 236, 220, 221, 356/218; 250/227

[56] References Cited

U.S. PATENT DOCUMENTS

| | | | |
|---|---|---|---|
| 4,130,363 | 12/1978 | Graham | 356/225 |
| 4,140,544 | 2/1979 | Sill | 250/227 |
| 4,178,101 | 12/1979 | Booth | 356/221 |
| 4,203,668 | 5/1980 | Chapman | 356/225 |
| 4,623,789 | 11/1986 | Ikeda et al. | 250/227 |

FOREIGN PATENT DOCUMENTS

| | | | |
|---|---|---|---|
| 0665361 | 10/1938 | Fed. Rep. of Germany | 356/225 |
| 0190729 | 11/1983 | Japan | 356/236 |

*Primary Examiner*—David C. Nelms
*Assistant Examiner*—William L. Oen
*Attorney, Agent, or Firm*—Pollock, Vande Sande & Priddy

[57] ABSTRACT

Apparatus for monitoring the intensity of light comprising an optical waveguide having a light-collecting tip end with a diffusing surface which is shaped so that it can collect and transmit light rays into the waveguide. The structure of the tip is such that it is capable of collecting rays which are directed toward the tip from all angles within a 360° arc. The tip may be conical, hemispherical, ellipsoidal or variations of these geometrical forms.

9 Claims, 6 Drawing Figures

PROBE FOR COLLECTING LIGHT FOR A RADIATION MONITORING DEVICE

This invention relates to devices for monitoring the intensity of light.

BACKGROUND OF THE INVENTION

The efficiency of processes which use light to make physical and/or chemical changes in material may depend upon the amount and/or the spatial distribution of the light, which in turn can be affected by the sizes, configurations and positioning of light sources, reflectors and objects to be treated. The effect of changes in equipment, such as structural changes in light sources and reflectors, can be determined by appropriate instruments. However, there is a need for instruments to monitor light which is highly concentrated in a small zone and/or which converges on an object to be treated through a 360° arc, such as light which originates at one focus of an elliptical reflector and is directed towards an object at the other focus.

SUMMARY OF THE INVENTION

It is accordingly one object of this invention to provide improved apparatus for monitoring light.

In accordance with this invention, there is provided apparatus for monitoring the intensity of light within a predetermined zone comprising (1) a probe for collecting light comprising an optical waveguide having a proximal end, a light conducting intermediate portion, and a forward end, said forward end comprising a light collecting tip having a non-planar, light diffusing surface and a cross-sectional area in a plane perpendicular to the axis of the probe which decreases to a minimum in proceeding to the outermost end of said tip; and (2) means optically coupled to said proximal end of said probe for measuring light intensity.

This apparatus is capable of monitoring light rays which are directed toward the tip through a 360° arc in a plane perpendicular to the axis of the probe, and in a preferred embodiment can monitor light which is restricted to a small zone, e.g., an area of 1-4 mm$^2$. A representative amount of the total energy which is directed towards the tip can be collected and determined in one step since there is no need to change the orientation of the collecting surface in order to conduct light coming from multiple directions as would be necessary in using a collector having, for example, a planar collection surface.

The term "light" as used herein is intended to mean radiant energy ranging from the infra red through visible light and into the ultraviolet.

DETAILED DESCRIPTION OF THE INVENTION

Figure 1:
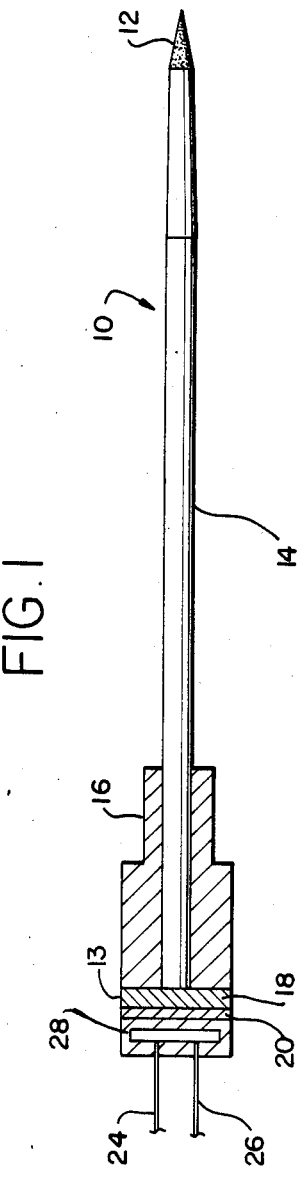
FIG. 1 is a sectional view of one embodiment of the light monitoring apparatus of this invention, including auxiliary elements for filtering, attenuating and sensing light which is collected by the tip of the probe.

Referring to FIG. 1, probe 10 comprises optical waveguide 14 which is provided at the formed end with tip 12 having a light diffusing collector surface and at the proximal end with light emitting surface 13. As shown in the Figure, probe 10 is mounted in housing 16 which contains light filter 18, light attenuator 20 and light detector 28. Signals from detector 28 are transmitted to signal indicating means, not shown, by signal transmitting wires 24 and 26.

Optical waveguide 14 is preferably a glass rod, such as for example a quartz rod; however, other materials which are capable of conducting light and which can withstand the environment in which the probe is to be placed may be used. The dimensions of the probe may be determined by the conditions of its use, taking into consideration the strength of the probe material. In a typical use a minimum diameter for a probe 25 to 50 cm. long is from about 2 to 4 mm.

In view of the relatively short distance that the light must travel within the optical waveguide, little light is lost to the walls, even if the waveguide is uncoated and, in view of its lower cost, an uncoated rod is preferred.

The tip 12 has a shape which, together with its light diffusing property, improves the collection of light which is directed towards the probe from all diretions. The light diffusing surface of the tip scatters light in a random fashion and a representative portion of the light rays are directed down the probe at an angle which is less than the critical angle so that the rays are reflected from, rather than passing through, the walls of the light guide. While the outer surface of the tip may be coated or covered with a material which diffuses light, in the preferred form of the invention, the outer surface comprises rod material which is frosted or etched to form a diffusing layer. For an optical waveguide made of quartz, the frosting may be accomplished by etching with HF, or by grinding the surface of the end and then etching with HF. The latter procedure is preferred since a grinding step can be used to shape the tip as well as to provide a coarse surface for etching with HF.

Figure 4:
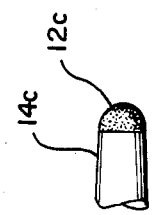
FIGS. 2, 3 and 4 show different embodiments of the tip of the probe.
Figure 3:
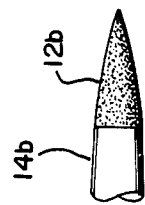
Figure 2:
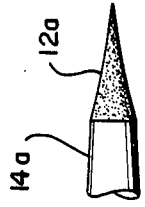

The tip must be non-planar, and for example, it may be conical as is shown in FIG. 1; it may have a modified conical shape as is shown in FIGS. 2 and 3; or it may have a surface generated by the rotation of a curved line as is shown in FIG. 4. However, it is essential that at least a portion of the diffusing surface be accessible to light rays which are directed towards the probe through a 360° arc in a plane which is perpendicular to the axis of the probe and which intersects the tip. Furthermore, at least a portion of the diffusing surface must be at an acute angle to the axis of the probe.

In the preferred form of the probe, the tip is in the shape of a right angle cone having an apex angle of from about 15° to about 90°, most preferably from about 20°-60° with the optimum apex angle being in the range from about 20° to about 30°. An apex angle within this range provides a diffusion surface which is capable of scattering a high percent of the light in a direction which is less than the critical angle for reflecting light along the optical waveguide.

For determining the light intensity in very small zones, it is necessary that the collecting tip occupy a space smaller than the zone of interest. Differences in intensities of light between adjacent zones which are no more than 1-2 mm in diameter can be detected with a probe having a conical tip with a diameter at the base of the cone of about 0.75 mm and an angle at the apex of the cone of about 20°. In the preferred form, the diameter of the collecting light at the base of the cone is from about 0.03 inch to about 0.06 inch.

Having thus described the invention, the following example is offered to illustrate it in more detail.

EXAMPLE

This invention was used to determine the distribution of light within a cylindrical quartz tube which was being subjected to ultraviolet radiation. The quartz tube, which had an internal diameter of about 1.9 cm was placed at one focus of an elliptical reflector with an ultraviolet light source at the other focus. The quartz tube was thus irradiated by light which was directed towards the tube through a 360° arc as measured within a plane perpendicular to the axis of the tube. The irradiation apparatus with the quartz tube in place is described in more detail in co-pending, co-assigned application Ser. No. 827,587, filed Feb. 10, 1986, by Charles Wood for Apparatus for Treating Coatings, and the disclosure therein of irradiation apparatus is hereby incorporated by reference. Typically, in this apparatus, material to be treated will be placed at or near the axis of the cylinder and the highest efficiencies are obtained when the maximum intensity of light is at the center and uniformly distributed about the center.

A probe as shown in FIG. 1 was constructed from a 3 mm quartz rod about 18 inches long. An end portion was reduced in diameter to about 1 mm and a tip was formed at the end by grinding to form a conical tip having an angle at the apex of about 20° and a base diameter of about 1 mm. The ground tip was etched in HF to form a diffusion surface which was capable of scattering ultraviolet.

Figure 5:
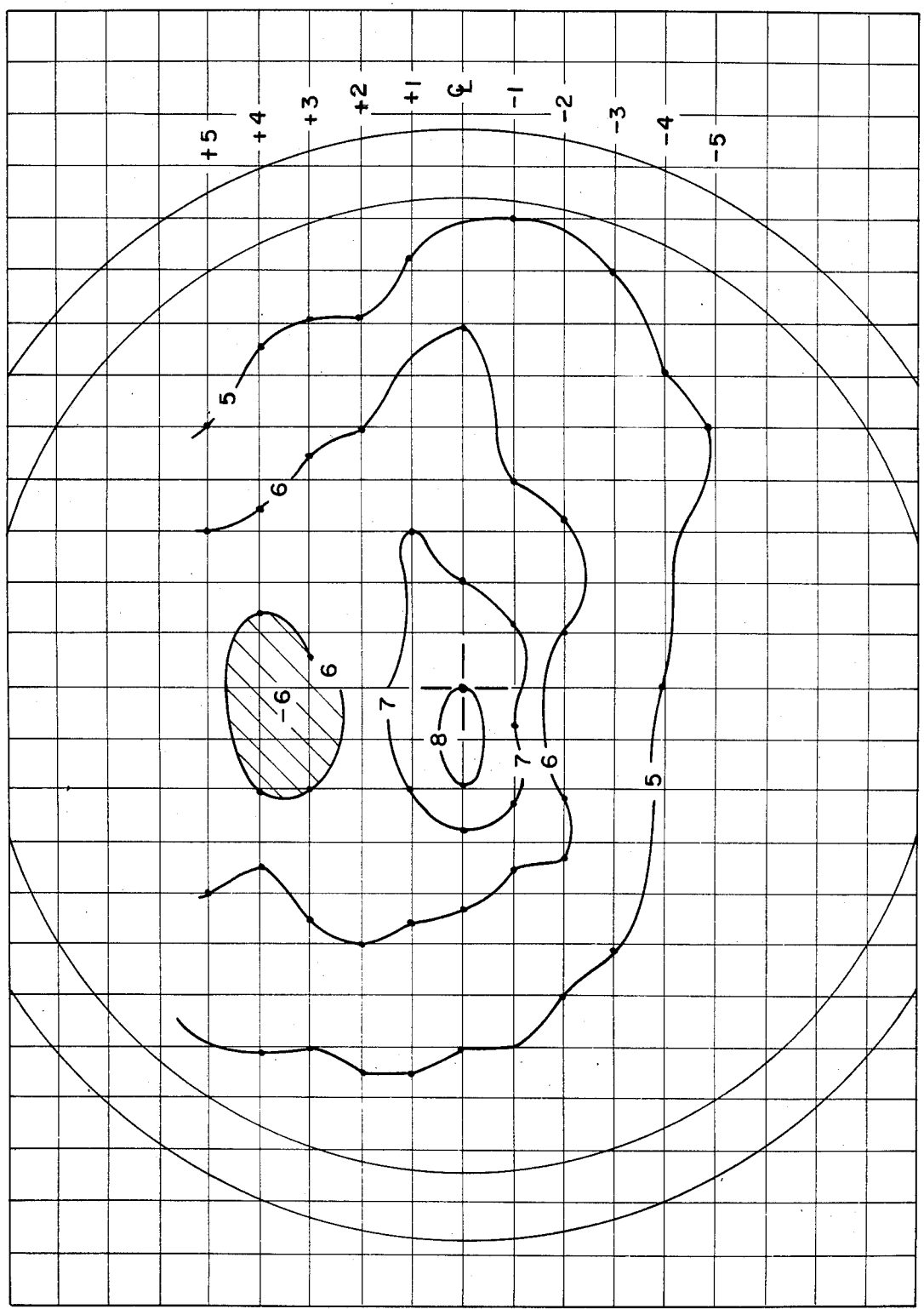
FIGS. 5 and 6 are isotropic graphs showing lines of light intensities, as measured by an instrument embodying this invention, at different positions within a horizontal plane within a cylindrical quartz tube which is being irradiated.

The resulting quartz rod was mounted in a housing as shown in FIG. 1, and the ground tip was inserted into the cylindrical quartz tube. The apparatus was mounted so that the tip could be traversed across the tube within a plane perpendicular to the axis of the tube. Light intensity measurements were made at various portions in the tube and plotted as shown in FIG. 5. The lines in FIG. 5 are isopleths of substantially equal light intensity within the tube, and the numerals indicate the relative intensities of the light at the positions indicated.

Figure 6:
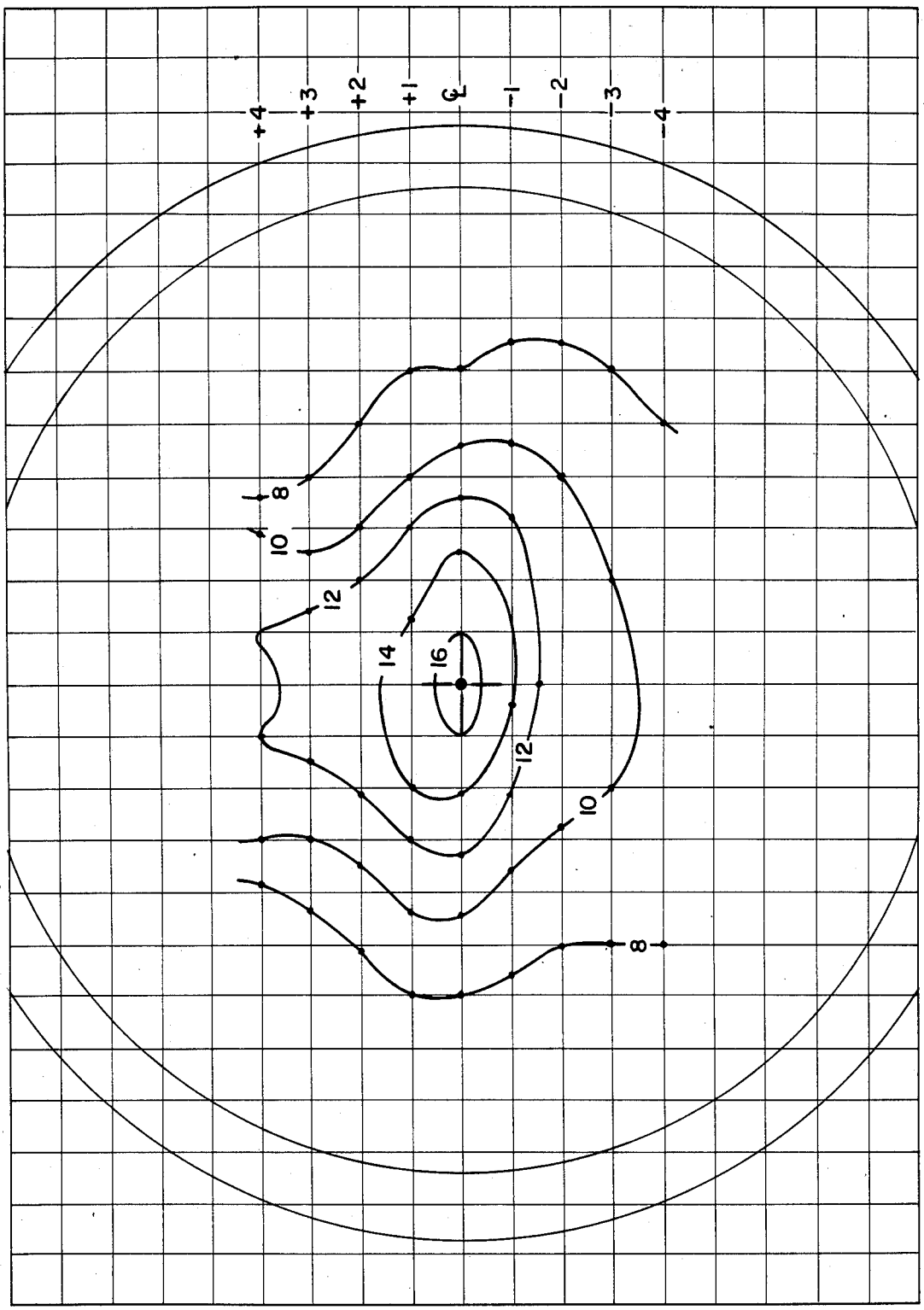

Modifications were made in the reflectors, and measurements were made to determine the extent of changes of light distribution within the quartz tube whch resulted from the modifications. These measurements were plotted as they had been for FIG. 5, and the results are given in FIG. 6. As can be seen from FIG. 6, the zone of highest intensity is about at the center and the intensity is about twice that shown in FIG. 5.

This example is offered to illustrate the capabilities of the probe of this invention in determining the variation in ligh intensities within small distances, i.e., distances of about 1 to 2 mm. The embodiment described herein are intended only to illustrate the invention, and it is applicant's intention to cover all modifications which come within the scope of the invention which is to be limited only by the claims appended hereto.

What is claimed is:

1. Apparatus for monitoring the intensity of light within a predetermined zone comprising:
   (a) a probe for collecting light comprising an optical waveguide having a proximal end, a light conducting intermediate portion, and a forward end, said forward end comprising a light-collecting tip formed from the waveguide having a non-planar, light-diffusing surface and a cross-sectional area in a plane perpendicular to the axis of the probe which decreases to a minimum in proceeding from the light-conducting intermediate portion to the outermost end of said tip; and
   (b) means optically coupled to said proximal end of said probe for measuring light intensity.

2. Apparatus according to claim 1 wherein said light diffusing surface is a surface of revolution.

3. Apparatus according to claim 1, wherein said optical waveguide is a light-conducting cylindrical rod and said light-collecting tip comprises a right angle cone which has been formed from said rod.

4. Apparatus according to claim 3 wherein the angle of the apex of said cone is from about 15° to about 90°.

5. Apparatus according to claim 3 wherein the angle of the apex of said cone is from about 20° to about 60°.

6. Apparatus according to claim 3 wherein the angle of the apex of said cone is from about 20° to about 30°.

7. Apparatus according to claim 3 wherein the angle of the apex of said cone is from about 20° to about 30°, and the diameter of the optical waveguide at the base of said cone is from about 0.030 inch to about 0.1 inch.

8. Apparatus according to claim 7 wherein the diameter of the optical waveguide at the base of said cone is from about 0.030 to about 0.06 inch.

9. Apparatus according to claim 1 wherein said nonplanar diffusing surface is a surface generated by the rotation of a curved line.

* * * * *